July 18, 1933. J. J. DEVINE Re. 18,897

STARTING DEVICE FOR INTERNAL COMBUSTION ENGINES

Original Filed April 23, 1930

Inventor:
James J. Devine,
By: Arthur Wm. Nelson
Atty.

Reissued July 18, 1933

Re. 18,897

UNITED STATES PATENT OFFICE

JAMES J. DEVINE, OF ALLENTON, MISSOURI, ASSIGNOR TO MARY BAKER FULCHER, OF CHICAGO, ILLINOIS

STARTING DEVICE FOR INTERNAL COMBUSTION ENGINES

Original No. 1,909,855, dated May 16, 1933, Serial No. 446,484, filed April 23, 1930. Application for reissue filed June 5, 1933. Serial No. 674,459.

This invention relates to starting devices for internal combustion engines. More specifically stated, it relates to a starting attachment for a vehicle equipped with an internal combustion engine, a motor to start said engine, and a transmission device including an operating member movable to transmit power from the engine to the vehicle.

Prior to this invention, there have been various attempts to provide vehicles driven by internal combustion engines with means to prevent premature starting of the vehicles. These attempts, however, have been unsuccessful due to the fact that the starter would at times be operated while the engine was firing, or while the engine was operatively connected to the vehicle.

An object of the invention is to provide a switch which will prevent the operation of the starting motor when the engine is firing.

A further object is to provide a switch which will prevent the operation of the starting motor when the vehicle is operatively connected to the engine.

With the foregoing and other objects in view, the invention comprises the novel construction, combination and arrangement of parts hereinafter more specifically described and illustrated in the accompanying drawing, wherein is shown the preferred embodiment of the invention. However, it is to be understood that the invention comprehends changes, variations and modifications which come within the scope of the claims hereunto appended.

Figure 3:
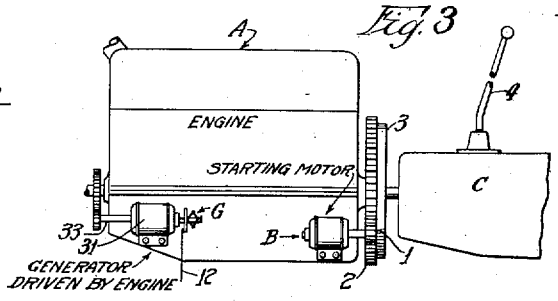
Fig. 3 is a diagrammatical view of the internal combustion engine, and a transmission device through which power may be transmitted from the engine to a motor vehicle.
Figure 4:
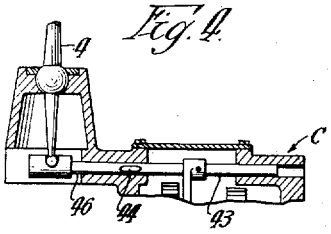
Fig. 4 is a vertical section showing parts of the transmission device.

To illustrate the invention I have shown a starting device for a vehicle equipped with an internal combustion engine A, a starting motor B (Figs. 1 and 3) having a pinion 1 adapted to mesh with the gear teeth 2 on the engine flywheel 3 to start said engine, a transmission device C including an operating member 4 (Figs. 1 and 4) movable, as will be hereafter described, from a neutral position to an active position in the usual manner, to transmit power from the engine to the vehicle.

In the preferred form of this invention the starting device comprises an electro-magnetic switch E (Fig. 1) for supplying electrical energy to the starting motor B, said electro-magnetic switch being controlled, as will be hereafter described, by a manually operated switch F, a speed responsive switch G, and switches H controlled by the operating member 4.

The source of electrical energy for the starting circuit may be the usual storage battery 5 (Fig. 1) which has one terminal, usually the negative terminal, grounded to the body of the vehicle, as indicated at 6. The other terminal of the battery is connected by the conductors or wires 7 to one terminal of the motor B. The other terminal of the motor being grounded at 8 to complete the electrical circuit. The flow of electrical energy through the conductors 7 is controlled by the electro-magnetic switch E, shown in Fig. 1.

Figure 1:
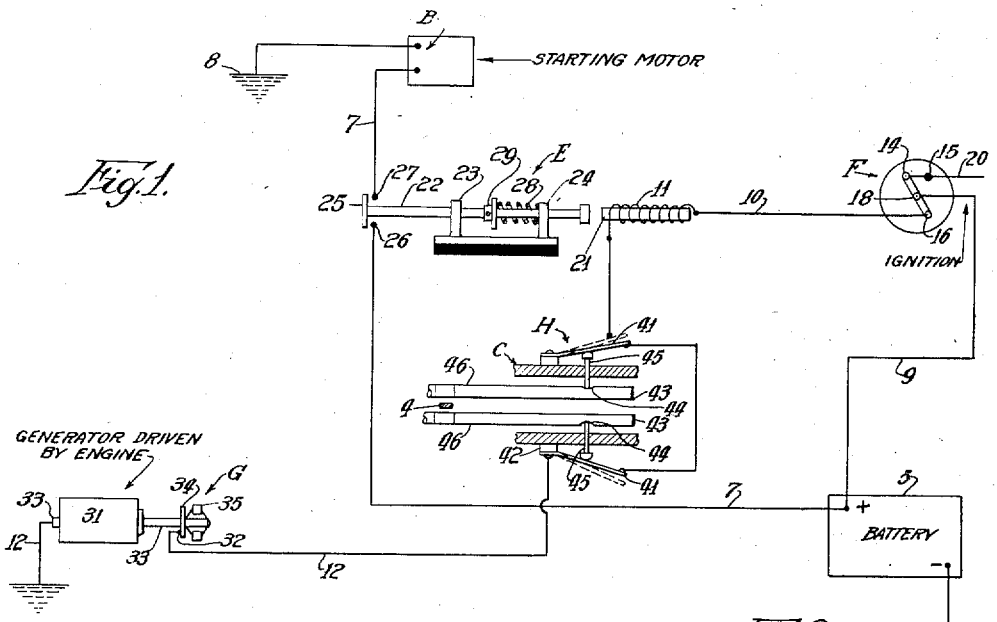
Fig. 1 is a diagrammatical view of a starting device embodying the features of this invention.

The positive terminal of the battery is also connected by the wire 9 to the manually operated switch F, which has a wire 10 leading to one end of the coil 11 of the electro-magnetic switch E, as shown in Fig. 1. The other end of the coil 11 can be electrically connected to conductors 12 leading to the ground at 13 so that an electrical circuit from the battery through the coil 11 may be obtained.

The switches H and the speed-responsive switch G are interposed in the conductors 12, so the current flowing through the coil 11 is controlled by these switches.

The manually operated switch F has a plurality of stationary contact points 14, 15 and 16 and a switch arm 17 rotatable on the shaft 18. The shaft 18 may be secured to the switch arm 17 by means of a nut 19.

The contact points 14 and 15 are connected by the wire 20 to an ignition system (not shown) which may be any of the conventional ignition systems used on motor vehicles having spark plugs operated from a battery. The contact point 16 which is opposite to the contact point 14 is connected by the wire 10 to the coil 11 of the electro-magnetic switch E.

The switch arm 17 is connected to the wire 9 which leads from the positive terminal of the battery 5. The switch arm 17 may be moved to the positions shown by the full lines and dotted lines in Fig. 2.

When the switch arm 17 occupies the position shown by the full lines (Figs. 1 and 2) it will contact with both of the contact points 14 and 16. Electrical energy will then be simultaneously transmitted from the battery 5 to the ignition system and to the coil 11 of the electro-magnetic switch which, as will be hereafter described, will supply electrical energy to the starting motor B.

Figure 2:
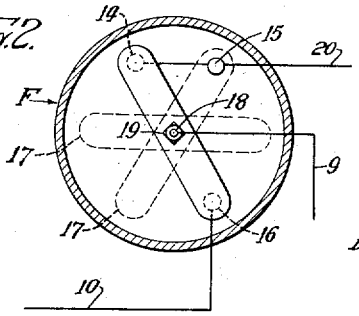
Fig. 2 is a detail view of the manually operated switch.

When the switch arm occupies the inclined position shown by the dotted lines in Fig. 2, it will contact with the contact point 15 and electrical energy is then supplied to only the ignition system. This position permits hand starting or rotation of the engine in testing operations, without the operation or interference of the starting motor.

When the switch arm 17 occupies the horizontal position shown by the dotted lines in Fig. 2, it is separated from the contact points and electrical energy will not be transmitted to either the ignition system or the starting circuit.

As has been stated when the switch arm 17 is in the position shown in Fig. 1 and by the full lines in Fig. 2, electrical energy will, except under conditions to be hereinafter described, be transmitted to the coil 11 of the electro-magnetic switch E. The electrical current passing through the coil 11 will magnetize a metallic core 21 which will draw a rod 22 through guides 23 and 24 to bring a switch member 25 at one end of the rod 22, into contact with the contact points 26 and 27. The contact points 26 and 27 are interposed in the conductors 7 leading from the battery to the starting motor. The contact point 26 is secured to a portion of the conductor which leads to the battery and the contact point 27 is secured to the conductor 7 leading to the starting motor. While electrical energy is flowing through the coil 11 the switch member 25 will remain in contact with the contact points 26 and 27 and electrical energy will be transmitted to the starting motor.

A spring 28 surrounds the rod 22 and is confined by the guide 24 and a collar 29 on the rod 22. The collar 29 is adjustable on the rod 22 to vary the tension of the spring 28. The spring 28 will keep the switch member 25 separated from the contact points when electrical energy ceases to pass through the coil 11.

When the speed of the engine A is increased under its own power, the starting motor B will cease to operate. This is accomplished by the speed of responsive switch G which is interposed in the conductors 12 leading from the coil 11 of the electro-magnetic switch. The speed-responsive switch G, when the engine is running under its own power, will break the circuit leading from the coil 11 to the ground. Since the electrical energy does not at this time pass through the coil 11, the spring 28 will shift the member 25 and open the circuit leading from the battery 5 to the starting motor B.

The speed-responsive switch G is operated by a member rotatable in accordance with the speed of the engine, such as a generator shaft 33 of a generator 31, which is ordinarily driven by the engine of a motor vehicle.

The speed-responsive switch G may comprise a contact point 32 (Figs. 5 and 6) secured to but insulated from the generator 31, the metallic generator shaft 33, a metallic disk 34 adapted to contact with the contact point 32, said disk being slidable on the shaft 33, and a centrifugal governor secured to said disk 34 and said shaft 33 to move said disk 34 out of contact with said contact point 32.

Figure 5:
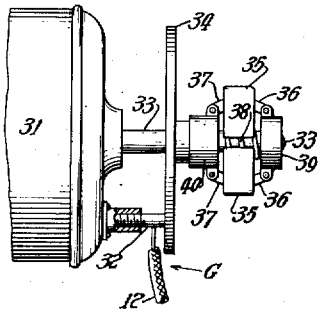
Fig. 5 is a detail view of a speed-responsive switch controlled by the engine, showing a portion of a generator through which rotary motion may be transmitted from the engine to the speed-responsive elements.
Figure 6:
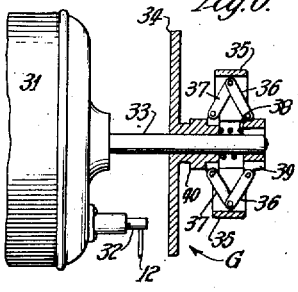
Fig. 6 is a view similar to Fig. 5, partly in section, showing the switch in its open position.

The governor, shown in Figs. 1, 5 and 6, comprise weights 35 and links 36 and 37. The links 36 are pivoted to the weights 35 and to a collar 39 rigidly secured to the shaft 33. The arms 37 are pivoted to the weights 35 and to an extended portion 40 of the slidable disk 34.

A spring 38 is interposed between the collar 39 and the extended portion 40 of the disk to keep the disk 34 in contact with the contact point 32 when the governor is in its inoperative condition, as shown in Fig. 5. The governor will remain in its inoperative condition until the engine begins to operate under its own power, thereby increasing the speed of the governor. At this time the speed of the generator shaft 33 is sufficient to throw the weights 35 outward, which action will slide the disk 34 on the shaft 33 and thereby separate the disk from the contact point 32, as shown in Fig. 6.

The contact point 32 is connected to the wire 12 leading from the coil 11 and the generator shaft 33 is connected to the ground, as shown at 13 in Fig. 1. While the governor is in its inoperative condition electrical energy may, therefore, be transmitted through the contact point 32, the disk 34, the shaft 33, and thence to the ground. However, when the engine fires and the governor is in its extended position, as shown in Fig. 6, the circuit between the contact point and the disk is broken. As a result, electrical energy will no longer be transmitted through the coil 11 and the starter will cease to operate.

The governor will keep the disk 34 separated from the contact point 32 as long as the engine is operating under its own power. However, if the engine should stop at any time, the governor will again resume its inoperative condition, as shown in Fig. 5. The circuit from the coil 11 to the ground will again be completed and the engine may be restarted as previously described.

While the foregoing construction will immediately and automatically start and restart the engine when all of the switches are closed, it is important that the engine should not be started while the engine is operatively connected to the vehicle. If such a condition should exist the vehicle would be put into motion and an accident might occur under certain conditions before the vehicle could be stopped.

To safeguard against such a condition I have provided the switches H which will prevent the transmission of electrical energy to the coil 11 of the electro-magnetic switch when the engine is operatively connected to the vehicle. These switches H are opened and closed in response to the movements of the operating member or gear shift lever 4. One of the switches H will be open whenever the gear shift lever 4 is in its active position, and both of the switches H will be closed whenever the gear shift lever is in its neutral position, as shown in Fig. 1.

The switches H are interposed in the conductor 12 leading from the coil 11. The switches H are connected in series as shown in Fig. 1, so that if either of said switches is open the electrical circuit to the coil 11 will be broken.

The switches H, which are arranged at opposite sides of the transmission, have spring switch arms 41 which tend to keep the switches in their closed positions. The switches H are insulated from the transmission housing by the insulation 42.

As one way of showing how the switches H may be opened in response to the movements of the gear shift lever 4, I have shown gear shift bars 43 having recessed cam faces 44 to receive the ends of slidable rods 45 when the gear shift 4 is in its neutral position. When the gear shift lever is moved to an active position, one of the gear shift bars will likewise be shifted, and the rod which had an end in the recessed portion will be acted upon by the cam face 44 of gear shift bar to force the switch arm to an open position. Each gear shift bar 43 has a straight face 46 extended from its cam face 44 to retain the adjacent switch arm 41 in its open position when the bar occupies its active position.

Therefore, during the time the engine is operatively connected to the vehicle one of the switches H will be open, and as a result the electro-magnetic switch E will not supply electrical energy to the starting motor.

When the gear shift lever 4 is replaced in its neutral position the rods 45 will again be located in the recessed cams 44, and the switches H will be closed to permit operation of the electro-magnetic switch.

In the ordinary operation of a vehicle equipped with the herein described starting device, the switch arm 17 will be placed in the position shown by the full lines in Fig. 2, and left in this position as long as the vehicle is in use. The starting motor will, thereafter, be operated automatically to keep the engine in an operative condition. However, the starting motor B will not be operated while the engine is firing or operatively connected to the vehicle.

However, if under some conditions it is desired to operate the vehicle without automatically controlling the starting motor, the engine may be started by placing the switch arm 17 in the position shown by the full lines in Fig. 2. When the engine is started, the switch arm 17 is turned to the inclined position shown by dotted lines in Fig. 2. The starting circuit is then disconnected, but electrical energy will still be transmitted to the ignition system for the continued operation of the engine.

When it is desired to stop the engine A, the switch arm 17 will be turned from whatever position is previously occupied to the horizontal position shown by the dotted lines in Fig. 2. When the arm is in this position the battery 4 is disconnected from both the ignition and starting circuits.

I claim as my invention:

1. In an attachment for an internal combustion engine having an ignition system and an electric motor for starting said engine, a switch comprising a plurality of contact points through which electrical energy is transmitted to energize said ignition system and motor, and a switch arm, said switch arm being movable to one of said contact points to supply electrical energy to said ignition system, said switch arm also being movable to simultaneously contact with two other of said contact points to supply electrical energy to both said ignition system and to start said motor.

2. In an attachment for an internal combustion engine having an ignition system and an electric motor for starting said engine, a switch comprising a plurality of contact points through which electrical energy is transmitted to energize said ignition system and motor, and a switch arm adapted to occupy an off position and movable to contact with said contact points, said switch arm being movable to a position at said contact points where it will provide for simultaneous transmission of energy to said ignition system and motor, and said switch arm being movable to another position to energize said ignition system and prevent the supply of energy to said motor.

3. In an electrical system for internal combustion engines including a starting motor, a source of electrical energy and an ignition circuit for the engine; an automatic controlling device for operating the starting motor in case of engine stall, and means for jointly operating the automatic controlling device and the ignition circuit, said means being also operative to control the ignition circuit while preventing the operation of the automatic controlling device.

4. In an electrical system for internal combustion engines including a starting motor, a source of electrical energy and an ignition circuit for the engine; an automatic controlling device for operating the starting motor in case of engine stall, and a switch for jointly connecting the automatic controlling device and the ignition circuit to the source of electrical energy, said switch being operative to connect the ignition circuit individually to the source of electrical energy.

5. In an electrical system for internal combustion engines including a starting motor circuit, an ignition circuit and a source of electrical energy included in said circuits, a magnetic switch in the starting motor circuit, a controlling circuit for said magnetic switch and a switch having two operative positions one for closing the ignition circuit and one for closing both the ignition and the control circuits.

6. In an electrical system for internal combustion engines including a starting motor circuit, an ignition circuit and a source of electrical energy included in said circuits; a magnetic switch in the starting motor circuit, a controlling circuit for said magnetic switch, manual means for initially jointly closing the ignition circuit and the control circuit and means for holding open said control circuit while the engine is self-operative, said closing means being operable to close the ignition circuit individually while maintaining said control circuit open.

JAMES J. DEVINE.